United States Patent [19]
Clements

[11] 4,377,397
[45] Mar. 22, 1983

[54] BAGHOUSE WITH ON-LINE MAINTENANCE CAPABILITY

[75] Inventor: Jack T. Clements, Raytown, Mo.

[73] Assignee: Standard Havens, Inc., Kansas City, Mo.

[21] Appl. No.: 351,887

[22] Filed: Feb. 24, 1982

[51] Int. Cl.³ .................................................. B01D 46/00
[52] U.S. Cl. ........................................ 55/97; 55/302; 55/341 R; 55/312; 55/481
[58] Field of Search .................... 55/96, 97, 302, 284, 55/288, 312, 341 R, 341 NT, 341 M, 341 H, 341 PC, 341 HM, 481

[56] References Cited

U.S. PATENT DOCUMENTS

| | | | |
|---|---|---|---|
| 3,513,638 | 5/1970 | Young | 55/302 |
| 3,839,850 | 10/1974 | Jamiol | 55/341 MC |
| 3,877,899 | 4/1975 | Bundy et al. | 55/302 |
| 4,158,554 | 6/1979 | Bundy et al. | 55/341 R |

FOREIGN PATENT DOCUMENTS 1040113 10/1978 Canada ................................. 55/302

*Primary Examiner*—Bernard Nozick
*Attorney, Agent, or Firm*—Kokjer, Kircher, Bradley, Wharton, Bowman & Johnson

[57] ABSTRACT

An industrial baghouse having a single clean air plenum in which a portion of the filter bags can be serviced while the baghouse remains on line. Service compartments in the clean air plenum can be individually isolated from the remainder of the clean air plenum by installing removable slide gates through normally sealed slots formed in the top of the baghouse. When a service compartment has been enclosed by the gates, it is isolated from the clean air plenum and access doors above the compartment can be removed to provide access for on line inspection and servicing of the filter bags and related components. Removable gaskets which normally seal the slots can be removed prior to insertion of the gates and replaced following removal of the gates.

10 Claims, 5 Drawing Figures

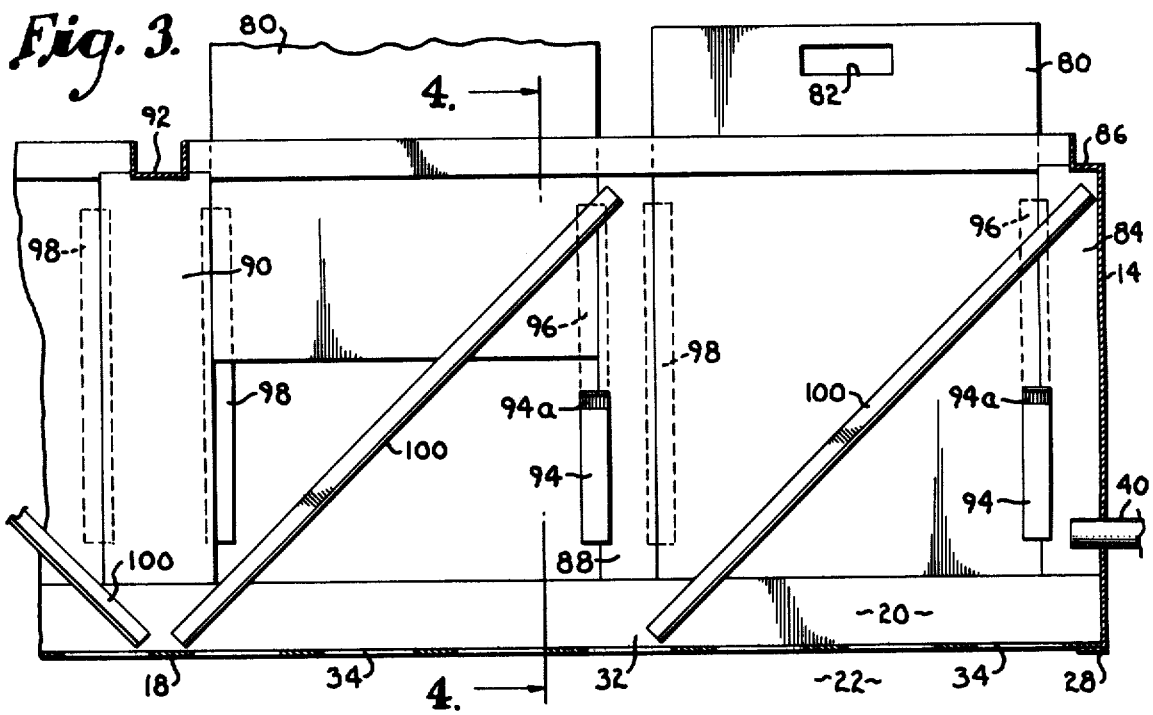
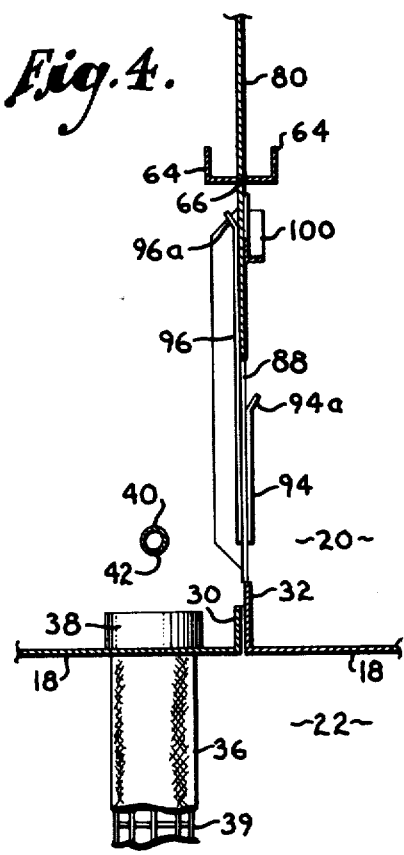

BAGHOUSE WITH ON-LINE MAINTENANCE CAPABILITY

BACKGROUND AND SUMMARY OF THE INVENTION

This invention relates in general to industrial baghouses and more particularly to a baghouse constructed in a manner to permit on line inspection and servicing of the filter bags.

Continuous emphasis on environmental quality has resulted in considerable importance being attached to the control of industrial emissions. One technique which has proven highly effective in controlling air pollution has been the separation of undesirable particulate matter from a gas stream by fabric filtration.

Such filtration is carried out in dust collection apparatus known in the trade as a "baghouse" which operates on the same general principle as an ordinary vacuum cleaner, except on a much larger scale. The baghouse includes a sheet metal housing which is divided by one or more tube sheets into two chambers referred to as plenums. Disposed in openings in the tube sheet are fabric filters. A particle laden gas stream is passed initially into one chamber (dirty air plenum) where dust accumulates on the fabric filters as the gas flows through the fabric into the other chamber (clean air plenum) and out of the unit through an exhaust duct.

Although all baghouses are constructed in accordance with the foregoing principles, there are numerous operational and structural differences among the various types of baghouses. The present invention is directed to a baghouse in which filtration occurs from the outside to the inside of each bag. In this type of baghouse, referred to as an outside bag collector, the dirty and clean air plenums are separated by the tube sheet, and the filter bags are suspended from the tube sheet with each bag having a cylindrical wire cage providing skeletal support.

Maintaining the filter bags in good condition is essential to effective removal of particulate from the process gas. If the bags are worn to the point of developing holes or other flaws, they do not effectively remove particulates and the gas stream is not properly filtered. The need to periodically clean the bags in order to remove built up dust cake is one of the primary causes of bag wear. Such cleaning is most often carried out by directing high pressure air into either the clean air plenum generally or in pulses into the individual bags in order to dislodge the accumulated dust cake. In either case, the high pressure air to which the bags are exposed during the cleaning cycle tends to deform the filter bags relative to their support cages, and such deformation causes the bags to become worn. In addition to the rough treatment resulting from cleaning, the filters are subjected to considerable wear resulting from the direct impingement of particulate matter against the filter fabric. If the baghouse operates in a corrosive and/or high temperature environment, the wear on the bags is accelerated.

Effective maintenance practice requires that the filter bags be regularly inspected and that bags found to be unduly worn be promptly replaced. In the past, inspection and servicing of the filters for a baghouse having a single clean air plenum has required that the entire baghouse be shut down for maintenance. As can be appreciated, this situation is highly undesirable because it increases the down time of the pollution control equipment and detracts from its efficient utilization of the whole process plant.

To permit on-line servicing of the filter bags, a relatively recent development in the industry is to build the baghouse in modules with each module being a substantially complete, yet small baghouse itself. For maintenance, only one module is taken off line for service while the remainder of the modules continue to perform their filtering function. A further description of a modularized baghouse for continuous, 24-hour operation is found in U.S. Pat. No. 4,158,554 of Bundy et al. issued June 19, 1979 and entitled "Apparatus for Filtering Particulate-Laden Gases". Modular baghouses, however, are only suited for processing plants having enormous filtering requirements.

Baghouses built before the advent of modular style construction and those used in conventionally sized processing plants still have a single, common clean air plenum serving all the filter bags in the unit. There is a need for a baghouse having a single clean air plenum in which maintenance work on the filters can be carried out with the baghouse remaining on line and operating effectively. It is a primary goal of the present invention to provide such a baghouse.

More specifically, it is an object of the invention to provide, in a baghouse having a negative pressure or pull through air handling system, a method and apparatus for selectively isolating service compartments in a single clean air plenum so that on line servicing can be carried out on the filters in the isolated compartments. In accordance with the invention, each service compartment can be isolated from the rest of the clean air plenum by inserting slide gates through normally sealed slots formed in the top of the baghouse. This manner of isolating the service compartments allows all of the filter bags within an isolated compartment to be safely inspected in systematic fashion while the baghouse is on line and without presenting a significant impediment to the flow of process gas through the baghouse. At the same time, the introduction of excessive complexity into the baghouse construction is avoided.

Another object of the invention is to provide, in a baghouse of the character described, simple and effective seal assemblies which normally seal the slots and which can be quickly and easily removed and replaced during the course of the bag servicing operation.

An additional object of the invention is to provide, in a baghouse of the character described, a guide arrangement for properly guiding the slide gates into the clean air plenum and maintaining them in position to enclose the compartment which is to be serviced.

A further object of the invention is to provide a baghouse of the character described which controls leakage and the amount of ambient air that is drawn into the baghouse during the bag servicing operation.

Other and further objects of the invention, together with the features of novelty appurtenant thereto, will appear in the course of the following description.

DETAILED DESCRIPTION OF THE INVENTION

In the accompanying drawings which form a part of the specification and are to be read in conjunction therewith and in which like reference numerals are used to indicate like parts in the various views:

FIG. 3 is a fragmentary sectional view on an enlarged scale taken generally along line 3—3 of FIG. 2 in the direction of the arrows, and showing one slide gate fully installed and another slide gate partially installed;

FIG. 4 is a fragmentary sectional view taken generally along line 4—4 of FIG. 3 in the direction of the arrows; and FIG. 5 is a fragmentary sectional view on an enlarged scale taken generally along line 5—5 of FIG. 2 in the direction of the arrows illustrating the seal slot construction.

Figure 1:
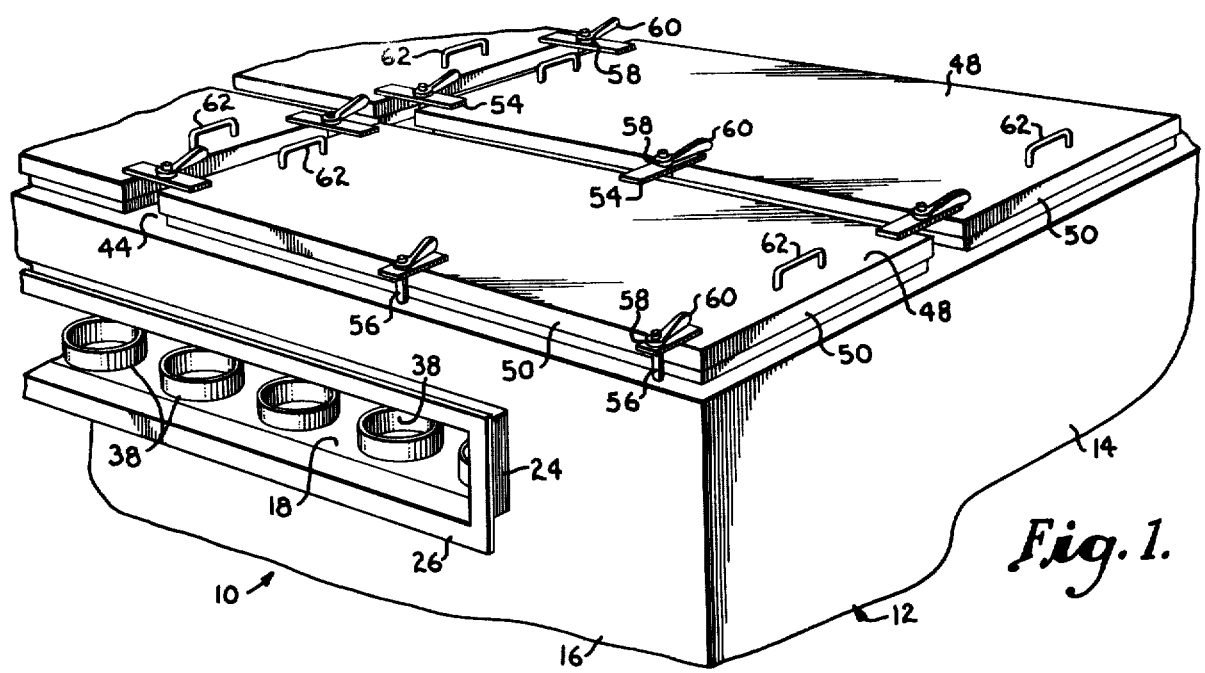
FIG. 1 is a fragmentary perspective view showing part of a single plenum baghouse constructed in accordance with a preferred embodiment of the present invention.

Referring now to the drawings in greater detail, numeral 10 generally designates a baghouse having a sheet metal housing providing the usual box like upper section 12 located atop a hopper shaped lower housing section (not shown). The housing is supported on a plurality of legs and is of the type shown in previously referenced U.S. Pat. No. 4,158,554 to Bundy et al.

Figure 2:
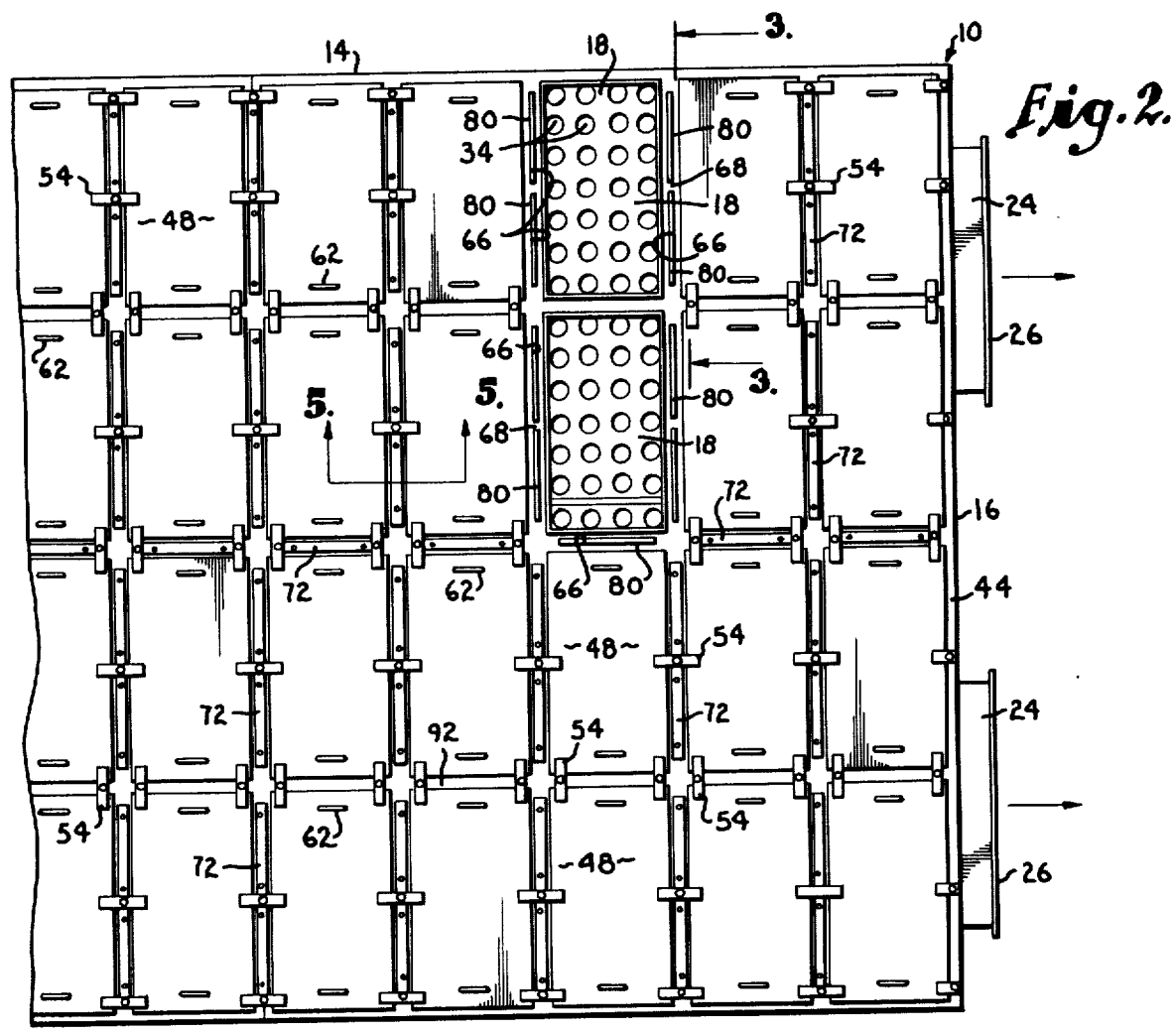
FIG. 2 is a fragmentary top plan view of the baghouse on a reduced scale, with slide gates installed around one of the service compartments to isolate it from the remainder of the clean air plenum of the baghouse.

The upper housing 12 includes a pair of side walls 14 and a pair of end walls 16 (only one of which is shown in FIG. 2). Supported within the upper housing 12 are a plurality of tube sheets 18 all located in a common horizontal plane. As best shown in FIGS. 3 and 4, the tube sheets 18 divide the interior of housing 12 into a clean air plenum 20 and a dirty air plenum 22 located below the clean air plenum. The dirty air plenum 22 has an inlet (not shown) into which the process gas containing particulate matter is introduced. The clean air plenum 20 has a pair of spaced apart outlets 24 in one of the end walls 16 through which the filtered air is discharged from the unit. Each outlet 24 has a peripheral flange 26 which may be connected with an exhaust duct. The exhaust duct work is equipped with a fan (not shown) which operates to pull the process gas through the baghouse in the usual manner.

With reference to FIGS. 3 and 4 in particular, each tube sheet 18 is received at one edge on a flange 28 extending inwardly from side wall 14 of the housing. Each tube sheet 18 has a pair of flanges 30 and 32 on opposite edges, with the flange 32 having a somewhat greater height than the other flange 30. The flange 30 of each tube sheet is disposed against the larger flange 32 of the adjacent tube sheet (see FIG. 4). Each tube sheet 18 has a series of holes 34 (FIG. 3) providing gas passages through which the process gas flows from the dirty air plenum to the clean air plenum. Each opening 34 receives a fabric filter bag 36 having an enlarged collar 38 on its upper end for suspending the bag from the tube sheet. Each bag 36 includes a conventional wire cage 39 providing skeletal support for the filter fabric. Cleaning of the filter bags 36 is accomplished, for example, by passing high pressure air through blow pipes 40 extending above the rows of filters. Each pipe 40 has a series of outlets 42 located above the mouths of the filter bags.

As best shown in FIG. 2, the top panel of the baghouse is formed by a grid 44 which provides a plurality of rectangular access openings 46 that are normally closed by removable doors 48. A plurality of channel members make up the grid 44.

With reference to FIG. 5, each door 48 has a downturned flange 50 on each edge. Gaskets 52 provide air tight seals between the doors 48 and the upper edges of the channel members forming the grid 44. Each door 48 is held down by a plurality of hold down bars 54 which are received on threaded shafts 56 extending upwardly from the grid 44, as best shown in FIGS. 1 and 2. An internally threaded collar 58 having a handle 60 may be tightened down on each shaft 56 against the hold down bar to hold the door down tightly on top of the underlying access opening. Loosening of the collars 58 permits the holddown bars to be turned such that they release from the doors, thereby permitting the doors to be lifted off to expose the access openings. Each door 48 is equipped with a pair of handles 62.

Referring again to FIG. 5, the channel members which make up grid 44 are each formed by a pair of angles 64. The edges of each pair of angles 64 are spaced apart to provide a plurality of thin slots 66 in the grid structure 44. As shown in FIG. 2, the ends of adjacent slots are separated by small plates 68 welded or otherwise secured to the angles 64 at appropriate locations. Each slot 66 is identical in size.

The clean air plenum 20 provides a number of service compartments which normally communicate with one another but which can be individually isolated from the remainder of the clean air plenum. The service compartments are rectangular and extend from side wall 14 to the channel member positioned along the longitudinal center line of the baghouse located midway between the two side walls 14. Grid 44 and tube sheet 18 define the upper and lower bounderies of each service compartment, and the opposite sides of the service compartments are defined by adjacent channel members extending between side wall 14 and the channel extending along the baghouse center line. Two of the access doors 48 thus overlie each service compartment. FIG. 2 illustrates the two access doors above one of the service compartments removed.

The slots 66 extend around the perimeter of each service compartment except for the end thereof defined by side wall 14. The service compartments located adjacent to the end walls 16 are bounded on one side by the adjacent end wall. Accordingly, the slots extend along only one end and one side of these compartments.

With particular reference now to FIG. 5, each slot 66 is normally sealed by a seal assembly having a seal strip or gasket 70 overlying the slot. A rigid bar 72 overlies each gasket 70. A pair of thumb screws 74 extend through each set of gaskets and bars near the opposite ends thereof. A horizontal roll pin 76 extends through a hole formed in the lower end portion of each thumb screw. When the thumb screw is oriented with its roll pin 76 parallel to the slot 66, the roll pin can be extended through or withdrawn from the slot. When the roll pin is oriented perpendicular to the slot as shown in the solid line view of FIG. 5, it will not fit through the slot. A nut 78 is threaded onto each thumb screw 74 above the seal bar 72.

The gaskets 70 are normally maintained in sealing position on top of the underlying slots 66 by positioning the roll pins 76 as shown in solid lines in FIG. 5 and tightening the nuts 78 down on top of the seal bars 72. This tightly compresses the gaskets 70 and effects an air tight seal for each slot. Removal of the seal assemblies is carried out by loosening nuts 78, turning each thumb screw 74 until its roll pin 76 is parallel to the slot, and then raising the thumb screws until the roll pins have passed through the slot. The seal assemblies can be replaced by inserting the roll pins through the slot, rotating the thumb screw through 90°, and then tightening the nuts 78.

The service compartments are isolated by slide gates 80 which are flat metal panels sized to fit closely in the slots 66. A cut out 82 located near the upper edge of each slide gate 80 provides a handle which facilitates lowering of the gate through the slot and raising it therefrom.

Referring particularly to FIGS. 3 and 4, each service compartment has a metal strip 84 located adjacent the end wall 14 and in the same vertical plane as the adjacent slot 66. Plate 84 is secured at its lower end to flange 32 of the underlying tube sheet and at its upper end to an angle 86 forming the side border of the grid structure 44. Each service compartment also has a metal plate 88 secured at its lower end to flange 32 and at its upper end to the plate 68 (see FIG. 2) located between the ends of adjacent slots 66. Plate 88 is likewise in the same plane as the adjacent slots. A third metal plate 90 underlies a channel member 92 which forms part of grid 44 and extends across the centers of the service compartments. Strip 90 is secured to flange 32 at its lower end and to channel 92 at its upper end. Each side of each service compartment is provided with a series of metal plates 84, 88 and 90.

A pair of guide strips 94 and 96 are welded or otherwise secured to the inside edge of each plate 84 and 88. Strip 96 is considerably taller than strip 94, and each guide strip 94 and 96 extends inwardly beyond the edge of the plate to which it is secured. Each pair of strips 94 and 96 are spaced apart sufficiently to closely receive the edge portion of gate 80 therebetween. The upper end of strip 94 is flared outwardly at 94a, and the upper end of each strip 96 is likewise flared as indicated at 96a. The flared ends 94a and 96a facilitate entry of the slide gates 80 into the space presented between the guide strips.

Additional guide strips 98 are secured to both edge portions of each plate 90 and to one edge portion of each plate 88. Strips 98 project beyond the edges of the plates to which they are secured and assist in guiding gates 80 into place and in maintaining the gates in the proper positions for isolating the service compartments. Inclined angle members 100 are secured at their lower ends to flange 32 and at their upper ends to one of the plates 84 or 88. The angle members 100 contact one surface of each gate 80 to assist in maintaining the gates in the proper positions.

In normal operation of the baghouse, dirty air is drawn into the dirty air plenum 22 and is passed through the filter bags 36 for filtration of the particulate matter. The clean air that enters the clean air plenum 20 is passed out of the unit through the outlets 24.

In accordance with the present invention, the filter bags 36 can be inspected and serviced while the baghouse remains in operation. To service the bags in a particular service compartment, the seal assemblies covering the slots 66 that border the selected service compartment are removed, and one of the slide gates 80 is inserted into each of the exposed slots. Most of the service compartments are bordered by nine slots, four on each side and one on the end opposite wall 14, although the service compartments located adjacent end walls 16 are bordered by only five slots since the end wall forms one side of the compartment.

As each gate is lowered into a slot, it enters the space presented between the underlying guide strips 94 and 96. These guide strips, in cooperation with strips 98 and angle members 100, assist in guiding the gates and maintain them in the proper vertical positions when they are fully inserted. The lower edge of each slide gate rests on top of flange 32, and the side edges of the gates abut the edges of plates 84, 88 and 90. The upper end of each gate projects above grid 44 such that the handle 82 is accessible for removal of the gate following the bag servicing operation.

When all of the gates bordering the selected service compartment have been installed, they cooperate with the side wall 14 (and, in some cases, the end wall 16) to form a barrier which completely encloses the service compartment and isolates it from the remainder of the clean air plenum 20. With the service compartment thus isolated from the low pressure applied to the clean air plenum by the fan, the two doors 48 overlying the service compartment can be removed to provide access to the interior thereof and to the filter bags 36, the support cages 39, the flow pipes 40 and other components in the compartment. After the filter bags in the service compartment have been inspected and replaced if necessary, the doors 48 are replaced, and the slide gates 80 are then removed from the slots 66 bordering the compartment. The seal assemblies are replaced on top of the slots, and the next selected service compartment can be isolated and serviced in the same manner.

In this fashion, all of the filter bags 36 can be inspected and serviced in accordance with a regular maintenance schedule. It is preferred that the service compartments located on one side of the longitudinal center line of the baghouse be serviced in succession, followed by servicing of the compartments on the opposite side of the center line. Since each row of slots borders two adjacent service compartments, it is preferred that adjacent service compartments be serviced in succession in order to minimize the removal and replacement of the seal assemblies over the slots.

It is noted that the service compartments adjacent to the end walls 16 are each bounded on one side by one of the end walls. When servicing the compartments located adjacent to the outlets 24, it is necessary to close a damper or valve (not shown) in the outlet duct in order to achieve isolation of the compartment.

It is contemplated that only one service compartment will be isolated for servicing at any one time. It is possible for plural compartments to be simultaneously serviced, although compartments located adjacent to one another (either end to end or corner to corner) should not be isolated at the same time in order to avoid blocking the air flow through the clean air plenum. In all other cases, the clean air plenum provides a continuous flow path through its entirety so that undue impedance of the air flow is avoided.

Significant air leakage into or out of the baghouse is avoided due to the effective manner in which slots 66 are sealed by gasket 70 and due also to the close fit of gates 80 with the slots 66 and other parts. Nevertheless, since the service compartments are not sealed in air tight fashion from the remainder of the clean air plenum, a small amount of ambient air is drawn into the baghouse. The amount of outside air that is drawn into the system and "short circuits" the filter bags is minimal and is dependent primarily upon the pressure differential between the work environment and the baghouse interior. The outside air results in a small reduction in the process air flow, and for this reason, the fan should be monitored during on line servicing of the bags.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible emodiments may be made of the invention without departing from the scope thereof, it is to be understood that all matter herein set forth or shown in the accompanying drawings is to be interpreted as illustrative and not in a limiting sense.

Having thus described the invention, we claim:

1. A method of carrying out on line servicing of filter bags in a baghouse having a housing, dirty and clean air plenums in the housing separated by a tube sheet from which the filter bags are suspended, and a plurality of normally closed access doors providing access to the clean air plenum when open, said method comprising the steps of:
   installing a plurality of removable gates in the clean air plenum in a configuration to form a substantially enclosed service compartment in the clean air plenum located above the filter bags that are to be serviced and below a preselected access door while said preselected door remains closed, thereby substantially isolating said service compartment from the remainder of the clean air plenum;
   opening said preselected door to provide access to said service compartment and the filter bags therein;
   servicing the filter bags in said service compartment;
   closing said preselected door; and
   removing said gates from the clean air plenum to reestablish communication between said service compartment and the remainder of the clean air plenum.

2. A method as set forth in claim 1, wherein said housing presents a plurality of normally closed slots in which said gates are received when installed in the clean air plenum, and including the steps of:
   opening the slots prior to said step of installing the gates in the clean air plenum; and
   closing the slots following said step of removing said gates from the clean air plenum.

3. A baghousing comprising:
   a housing having a horizontal tube sheet therein separating the housing into a dirty air plenum and a clean air plenum, said clean air plenum providing a plurality of normally communicating service compartments therein;
   a plurality of filters associated with the tube sheet for filtering gases that are passed through the filters from the dirty air plenum to the clean air plenum;
   a top panel overlying said clean air plenum, said panel having a plurality of access openings therein providing access to the filters through the corresponding service compartments;
   a plurality of doors normally closing the respective access openings, each door having an open position exposing the corresponding access opening;
   a plurality of slots in said top panel between the access openings, said slots being arranged to extend along edges bordering the service compartments;
   removable seal means for normally sealing each slot; and
   a plurality of gates each having sufficient length to substantially span the distance between the top panel and tube sheet, said gates being selectively insertable through the slots bordering each service compartment to cooperate in forming a barrier substantially isolating the selected service compartment from the remainder of the clean air plenum, thereby permitting inspection and servicing of the filters in the selected service compartment while the baghouse is in operation.

4. A baghouse as set forth in claim 3, including means in the clean air plenum for maintaining each gate in a substantially vertical orientation when inserted through one of the slots.

5. A baghouse as set forth in claim 3, including a handle on each gate, said handles projecting above the top panel when the gates are inserted through the slots.

6. A baghouse as set forth in claim 3, including spaced apart guide members in the clean air plenum positioned to closely receive edge portions of the gates therebetween when the gates are inserted in the slots.

7. A baghouse as set forth in claim 3, wherein said seal means includes for each slot:
   a seal element adapted to cover the slot;
   a rigid bar overlying the seal element; and
   removable fastening means for pressing the bar down on the seal element to compress the seal element over the slot in sealing relation thereto, said fastening means being removable to permit removal of the seal element and bar prior to insertion of one of the gates through the slot.

8. A baghouse as set forth in claim 7, wherein said fastening means includes:
   a threaded shaft adapted to extend through the slot;
   a pin on said shaft adapted to fit through the slot when said shaft has a first preselected rotational position and to prevent withdrawal of the shaft from the slot when the shaft has a second preselected rotational position; and
   a nut threadably received on said shaft and adapted to be tightened thereon against said bar to maintain said shaft in said second rotational position with said seal element compressed between said nut and pin.

9. A baghousing comprising:
   a housing;
   a horizontal tube sheet in said housing separating same into dirty and clean air plenums, said tube sheet having a plurality of gas passages and a plurality of filter bags in the respective gas passages for filtering process gas passed through the passages from the dirty air plenum to the clean air plenum;
   a grid structure on said housing above the clean air plenum, said grid structure having a plurality of spaced apart access openings providing access to the clean air plenum and a plurality of slots located between the access openings;
   a plurality of doors normally closing the respective access openings, each door having an open position exposing the corresponding access opening;
   a removable seal strip for each slot, each seal strip normally overlying the corresponding slot to close the same and being removable from the grid structure to expose the underlying slot;
and
a plurality of gates adapted to extend through the slots and insertable through selected slots when the corresponding seal strips have been removed to provide a plurality of substantially enclosed service compartments in the clean air plenum beneath the access openings, each service compartment when enclosed being substantially isolated from the remainder of the clean air plenum to permit inspection and servicing of the filter bags in the compartment while the baghouse is in operation.

10. A baghouse as set forth in claim 9, including:
a rigid bar associated with each seal strip;
and
removable fastening means for holding each bar down on top of the corresponding seal strip to compress the seal strip over the slot in sealing relation thereto, each fastening means being releasable to permit removal of the seal element and bar.

* * * * *